Figure 1:
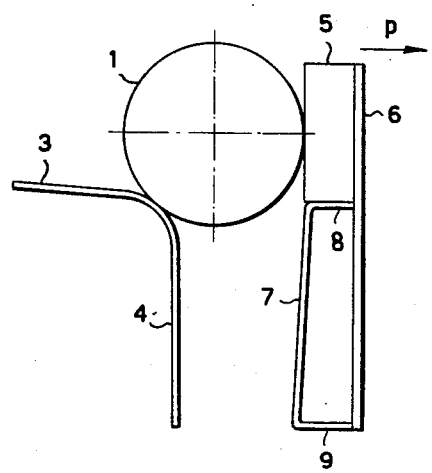

March 31, 1964   J. VAN DER SCHOOT   3,126,993
PROCESS AND APPARATUS FOR TURNING EGGS TIP-DOWN
Filed Oct. 17, 1960   3 Sheets-Sheet 1

March 31, 1964   J. VAN DER SCHOOT   3,126,993
PROCESS AND APPARATUS FOR TURNING EGGS TIP-DOWN
Filed Oct. 17, 1960   3 Sheets-Sheet 2

March 31, 1964  J. VAN DER SCHOOT  3,126,993
PROCESS AND APPARATUS FOR TURNING EGGS TIP-DOWN
Filed Oct. 17, 1960  3 Sheets-Sheet 3

United States Patent Office 3,126,993
Patented Mar. 31, 1964

3,126,993
PROCESS AND APPARATUS FOR TURNING
EGGS TIP-DOWN
Jelle van der Schoot, Aalten, Netherlands, assignor to
Dirk van Katwijk, Velp, Netherlands
Filed Oct. 17, 1960, Ser. No. 62,994
Claims priority, application Netherlands Oct. 16, 1959
12 Claims. (Cl. 193—43)

It is a well-known fact that eggs will keep for a far longer time when stored and transported in a tip-down position. If this is not done, the air chamber will be underneath and there is a chance of this chamber getting detached, causing the egg to turn bad earlier.

Besides this, all eggs should be in the same position in order to obtain the most efficient possible use of the room available in packing materials.

Up to now, however, no satisfactory way has been found to turn eggs tip-down mechanically without involving the necessity of having the eggs roll down rather long courses; this may easily induce breaking of the chalazae, which constitutes an unfavourable factor with respect to the keeping qualities of the eggs. Moreover, the known mechanical process for turning eggs tip-down requires a very complicated apparatus necessitating expert handling and adjustment.

A first object of the invention is accordingly to provide a process for mechanically turning the eggs tip-down without necessitating them to roll along considerable courses.

A second object of the invention is to provide an extremely simple and efficient device in order to attain the first object.

Owing to the shape of the eggs it is not difficult to have them take such a position that their longitudinal axis lies along a predetermined line. The main difficulty, however, is to cause all the tips to be turned in the same direction.

According to the invention the eggs are being mechanically turned tip-down by putting them between two mainly vertical, downward slightly converging plates, that are slowly moved apart.

Owing to the only slight convergency of the plates the points of contact of the egg with these plates are positioned very close to the largest diameter of the egg perpendicular to its axis. The centre of gravity of an egg, however, lies at some distance from said largest diameter; this is even the case with almost symmetric eggs, the tips of which are rather difficult visually to discern, because the air chamber is positioned at the side averted from said tips. Now when the egg is supported by the two converging plates, the centre of gravity will be positioned on that side of the connecting line between the points of contact of the egg with the plate, where the tip is situated, too, causing a torque to be exerted upon the egg so that it is turned tip-down.

According to a first aspect of the invention the slightly converging plates receive a movement keeping them parallel to themselves.

According to a further aspect of the invention one of the two plates can move against a resilient means or such-like, under the influence of the forces exerted by the egg positioned between the plates.

According to yet a further aspect of the invention one plate is slightly swung round with respect to the other, causing the separating movement to involve a small angular displacement of the plates relative to one another.

When initially the eggs are positioned with their longitudinal axes in one direct line and afterwards are put between the plates, they would, when moving downward straight along the plates, take mutual distances larger than necessary for efficient packing.

Accordingly a further aspect of the invention provides at least one of the plates with guides to move the eggs toward one another.

Figure 2:
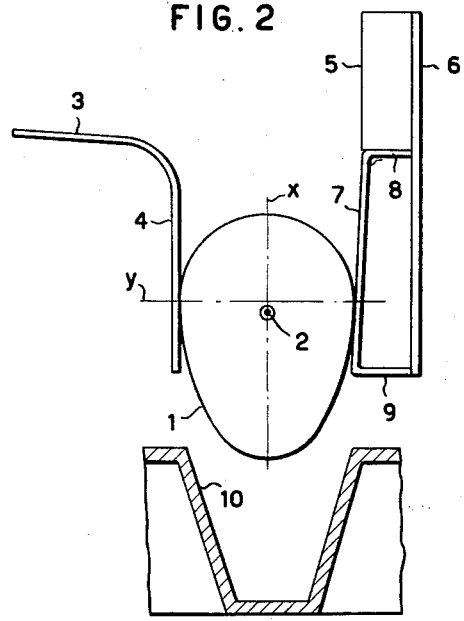
Figure 3:
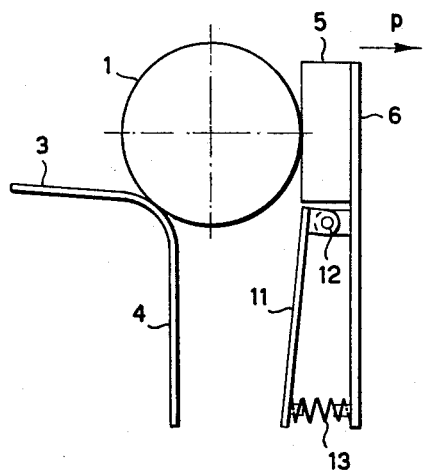
Figure 4:
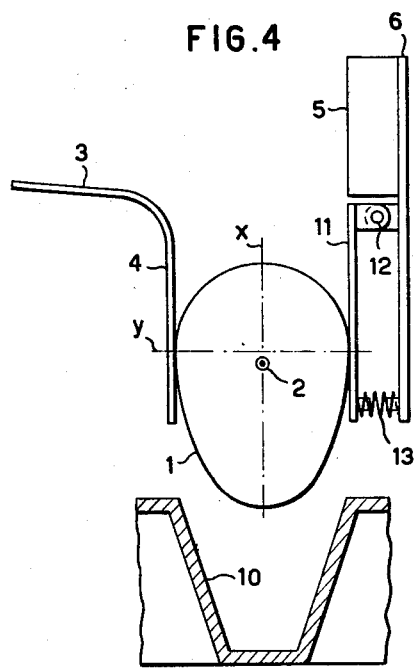
Figure 5:
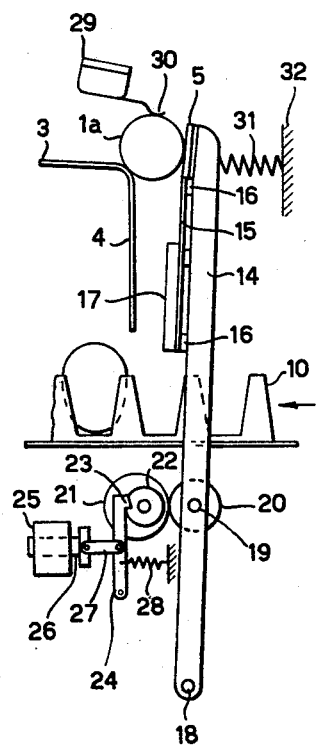
Figure 6:
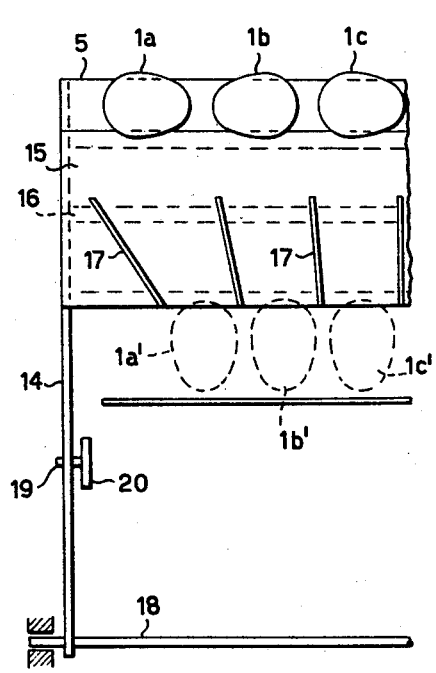

The invention is further illustrated by the drawing, in which:

FIG. 1 schematically shows a first embodiment with an egg not yet turned tip-down;
FIG. 2 shows the same embodiment in a further stage, the egg being turned tip-down;
FIG. 3 and 4 show second embodiment in the same way as FIG. 1 and 2;
FIG. 5 shows a further elaborated example of a third embodiment; and
FIG. 6 is half of the frontal view of the embodiment of FIG. 5.

The three embodiments shown in the drawing all relate to working hen's eggs. For handling other eggs basically the same devices can be used, but for the distance between the plates and, if necessary, the movement made by the plates relative to one another, which have to be adapted to the dimensions of the eggs.

FIG. 1 shows an egg 1 conveyed along supply guide 3 and stopped by the block 5, which is made in soft elastic material.

The supply guide 3 is bent downward to a plate 4, opposite to which a plate 7 is situated, which is adjacent to the block 5. The plates 4 and 7 are slightly converging downward, the angle between them preferably lying between 2° and 4°. The plate 7 is mounted with supporting members 8 and 9 on a movable supporting plate 6, on which also the block 5 is mounted.

As is schematically indicated in FIG. 1 with arrow $p$, the plate 6 in the drawing can be moved to the right. The speed of movement of this plate preferably does not exceed 2 cm./sec. Very good results have been obtained with a speed of 1.5 cm./sec.

When the plates move apart and the egg gets between plates 4 and 7, it touches these plates. The line $y$, connecting the points of contact, intersects the longitudinal axis $x$ of the egg above the centre of gravity 2 of the egg. This causes the egg to turn its tip downward and by reason of the relative movement of the plates the egg gradually sinks between the plates. At the bottom the egg can be received in a packing 10, or in a guiding channel or suchlike, in which it can be conveyed further.

In the embodiment of FIGS. 3 and 4 the same references have been used as in FIGS. 1 and 2, with the exception of the fixed plate 7, which in this embodiment is replaced by a plate 11, which is hingeable in point 12 and is impeded from swinging to the right by a spring 13. When the plate 6 is moved to the right in the direction of the arrow $p$, the egg gets in between the plates 4 and 11 and carries out a sinking movement during which it turns tip-down. When the egg touches the plate 11 at a predetermined distance from the pivot point 12, the force exerted by the egg on plate 11 becomes so strong that said plate 11 will hinge around pivot 12. Thereby the convergency between plates 4 and 11 is changed, increasing the distance between the line $y$ which connects the points of contact of the egg with plates 4 and 11, and the centre of gravity of the egg, causing an accelerated turning-down movement of the tip. Besides the egg glides down a bit quicker, but the resilience of spring 13 is large enough to guarantee a sufficient friction, so that the egg will not fall suddenly.

In FIGS. 5 and 6 an embodiment is shown, in which again the same references as before are used for corresponding members. In FIG. 5 the egg is indicated with $1a$, as in this embodiment six eggs at the same time are handled, of which three are shown in the drawing, indicated with $1a$, $1b$, $1c$, etc. On a hingeable lever 14 the plate 15, corresponding with plate 7, is mounted by means of supporting members 16. The plate 15 carries guides 17 and the lever 14 can be rotated around a shaft 18. In a journal 19 of the lever 14 a freely rotating cam following roller 20 is mounted running against a cam disc 21. The cam disc 21 is fixedly attached to a ratchet wheel 22 and is adapted together with said ratchet wheel to rotate about a common shaft, upon which a continuous driving force is exerted by a friction coupling not shown in the drawing, which coupling may be of any known construction. In a recess of the ratchet wheel 22 a ratchet 23 is gripping, which ratchet can be hingeably mounted at the bottom in 24. The electromagnet 25 is provided with an armature 26 connected with the ratchet 23 by means of the rod 27. The spring 28 counteracts the electromagnet 25, which is controlled by microswitches 29 having switch levers 30. Said levers are mounted in such a way that the switches are closed when an egg is in the position of egg 1a in FIG. 5. In the embodiment shown six eggs at a time are handled and consequently six microswitches 29 have been provided, all of which are connected in series with a suitable source of current and the exciting winding of the magnet 25.

The lever 14 is influenced by a pushing spring 31, which is fixedly supported on the frame at 32.

The device for supplying the eggs is not shown in the drawing and in principle any supplying device for eggs known per se may be used. Thus it is possible to let the eggs roll slowly along the plate 3 and to control the supply by means of stop devices actuated in accordance with the rhythm of the apparatus. An other solution consists in supplying a number of eggs positioned on carrying members, e.g. the links of a suitable chain, in the direction perpendicular to the plane of drawing in FIG. 5, afterwards pushing them from the carrying members, causing them to roll along till they reach the position shown in FIG. 5.

The operation of the apparatus is described below.

When six eggs 1a, etc. are in the position indicated in FIG. 5, all the microswitches have been closed by their levers 30 and the electromagnet 25 is pulling the core 26 towards the left, said core thereby swinging the ratchet 23 likewise to the left. This causes the ratchet wheel 22 with the cam disc 21 to rotate clockwise under the influence of the friction coupling not shown in the drawing, the cam disc swinging the cam following wheel, and thereby the lever 18 to the right, so that the eggs can slide further downwards. This causes the microswitches to be cut off, as well as electromagnet, but the ratchet runs further against the ratchet wheel 22 until a complete rotation has been made. Then the ratchet 23 falls back into the recess in the ratchet wheel 22 and stops it, notwithstanding the torque exerted thereon by the friction coupling. During their downward movement the eggs carry out the rotating movement described between the plates 4 and 15, and so attain a tip-down position. During this movement the eggs touch the guides 17, which direct them transversely in such a way, that the middlemost eggs experience only a slight displacement, whereas the outermost eggs undergo a large displacement. As the eggs unceasingly remain between the slightly converging plates 4 and 15, they will immediately recover their tip-down position should they have been slightly tilted by the guides 17, after which they can fall vertically into the packings 10. The latter stage is schematically indicated in FIG. 6 with the eggs 1'a, 1'b and 1'c.

The plates 4 and 7, 11 or 15 should be preferably flat. Indeed a slight concave or convex curvature is possible, but a convex plate causes a displacement perpendicular to the plane of drawing of FIGS. 1, 3 and 5, whereas a concave shape increases the danger of the egg swinging through the vertical tip-down position. A concave shape consequently requires a somewhat slower tempo of the apparatus.

The material of the plates 4 and 7, 11 or 15 may be metal, but it is also possible to coat them with felt, rubber or a similar material. A velours coating having a short pile of 1–0.5 mm. has turned out favourable to prevent the eggs from swinging through the vertical position.

The preferred angle between the plates 4 and 7, as well as between the plates 4 and 11 or 4 and 15, when the egg is positioned between said plates, is between 2° and 4°.

The whole cycle of movements can be carried out in about 2 seconds.

The apparatus has proved to be extremely reliable, even when handling eggs of various sizes.

The mutual displacement of the two slightly converging plates need only be suchlike, that the smallest eggs to be handled will not fall through between the plates at the start of the separating movement of these plates, and that the largest eggs can pass between the plates when they are in their most separated position.

When handling hen's eggs which have not been preassorted at all, practice has shown that a movement of about 2 cm. will suffice. When the eggs have been preassorted according to their size, which is usually the case, a smaller movement will do, and consequently the working speed of the apparatus will be higher.

The means for moving the plates relative to one another can be chosen at will. One might e.g. make use of crank-shaft mechanisms, cam mechanisms, screwthread mechanisms, eccentric mechanisms, hydraulic or pneumatic mechanisms, in short of any known means for engendering a to-and-fro movement. Preferably a driving means having a rather small speed of movement when the plates are moved apart, and a larger speed when the plates are moved towards one another, is used. At the moment when the plates are closest to each other they can stand still relative to each other, so that the next row of eggs can be supplied on the slit between the two plates. Being completely still, however, is not absolutely necessary, provided the time necessary for the eggs to take in their position on the slit is smaller than the time necessary for the plates to move apart so far, that a small egg will not be supported on the slit between the plates when reaching said slit.

Practice has shown that even for visually oval eggs, when applying the invention, a rotation can be attained causing the air chamber to get to the top of the egg.

The indicated angle of 2°– 4° between the plates of course is the angle contained by the plates at the moment when the egg is in between them. For eggs of larger asymmetry than hen's eggs, this angle can be slightly increased.

A further important aspect of the invention is the fact, that the eggs touch the plates with very small contacting areas. This causes any damage to the skin to be confined thus limiting the evaporation of moisture, that in practice no harm has been caused and there is no danger of the eggs turning bad earlier.

I claim:

1. Process for turning one or more eggs from an initial position in which the longitudinal axis is horizontal, into a position in which the longitudinal axis is vertical and the tip of the egg is directed downwards, characterized in that the egg is put with its longitudinal axis lying horizontal between two downward slightly converging plates, after which the plates are moved apart, so that the egg slides downward between them, turns tip-down under the influence of gravity, and is then received at the bottom of the plates in its tip-down position.

2. Process for turning one or more eggs from an initial position, in which the longitudinal axis is horizontal, into a position, in which the longitudinal axis is vertical and the tip of the egg is directed downwards, characterized in that the egg is put with its longitudinal axis lying horizontal between two downward slightly converging plates, after which the plates are moved apart parallel to themselves, so that the egg slides downward between them, turns tip-down under the influence of gravity, and is then received at the bottom of the plates in its tip-down position.

3. Process for turning one or more eggs from an initial position, in which the longitudinal axis is horizontal, into a position, in which the longitudinal axis is vertical and the tip of the egg is directed downwards, characterized in that the egg is put with its longitudinal axis lying horizontal between two downward slightly converging plates, after which the plates are moved apart so that the convergency of the plates during their mutual displacement is changed over a small angle and the egg slides downward between them, turns tip-down under the influence of gravity, and is then received at the bottom of the plates in its tip-down position.

4. Process for turning one or more eggs from an initial position, in which the longitudinal axis is horizontal, into a position, in which the longitudinal axis is vertical and the tip of the egg is directed downwards, characterized in that the egg is put with its longitudinal axis lying horizontal between two downward slightly converging plates, after which the plates are moved apart, so that the egg slides downward between them, the angle between the plates being between 2° and 4° during at least a portion of the sliding movement of the egg, by reason of which the egg turns tip-down under the influence of gravity, and is then received at the bottom of the plates in its tip-down position.

5. Process for turning one or more eggs from an initial position, in which the longitudinal axis is horizontal, into a position, in which the longitudinal axis is vertical and the tip of the egg is directed downwards, characterized in that the egg is put with its longitudinal axis lying horizontal between two downward slightly convering plates, after which the plates are moved apart with a speed not exceeding 2 cm./sec., so that the egg slides downward between them, thurns tip-down under the influence of gravity, and is then received at the bottom of the plates in its tip-down position.

6. Apparatus for turning one or more eggs from an initial position, in which the longitudinal axis of the egg is horizontal into a position in which the said axis is vertical and the tip of the egg is directed downwards, provided with two opposing rigid, flat or approximately flat plates slightly converging downwards and driving means for automatically moving the plates relative to one another such that the space between the plates is broadened and narrowed between two extreme positions.

7. Apparatus for turning one or more eggs from an initial position, in which the longitudinal axis of the egg is horizontal into a position in which the said axis is vertical and the tip of the egg is directed downwards, provided with two opposing rigid, flat or approximately flat plates and driving means for automatically moving the plates relative to one another such that the space between the plates is broadened and narrowed between two extreme positions, the plates at least during a major part of their horizontal movement converging downwards at an angle between 2° and 4°.

8. Apparatus for turning one or more eggs from an initial position, in which the longitudinal axis of the egg is horizontal into a position in which the said axis is vertical and the tip of the egg is directed downwards, provided with two opposing flat or approximately flat rigid plates slightly converging downwards and driving means for automatically moving the plates relative to one another such that the space between the plates is broadened and narrowed between two extreme positions, one of the plates having a substantially horizontal upper edge connected to a slightly inclining supply course for the eggs not yet turned, said course extending perpendicular to said upper edge, and the second plate being provided at the upper side opposing the supply course with a resilient member, the surface of said resilient member smoothly joining the surface of the said second plate.

9. Apparatus for turning one or more eggs from an initial position, in which the longitudinal axis of the egg is horizontal into a position in which the said axis is vertical and the tip of the egg is directed downwards, a first plate fixedly supported and a second plate mounted to hinge around a rotation shaft positioned parallel to said plates, both of said plates being rigid, flat or approximately flat, driving means for automatically and positively swaying the said second plate around said rotation shaft for alternately narrowing and broadening the space between the plates, the mounting of the plates and the driving means being such that the plates converge in a downward direction with an angle of between 2° and 4° during at least an important part of their relative movement due to the working of the driving means.

10. Apparatus for turning a plurality of eggs, from an initial position, in which the longitudinal axes of the eggs are horizontal into a position in which the said axes are vertical and the tips of the eggs are directed downward, provided with two opposing approximately flat plates slightly converging downwards and driving means for automatically moving the plates relative to one another such that the space between the plates is broadened and narrowed between two extreme positions, at least one of the plates being provided with a plurality of oblique downwardly converging guides protruding from said plate, said guides having a tilting angle away from the vertical plane which is smaller for the guides near the centre of the plate than for the guides toward the outside of the plate.

11. Apparatus for turning one or more eggs from an initial position, in which the longitudinal axis of the egg is horizontal into a position in which the said axis is vertical and the tip of the egg is directed downwards, provided with two opposing approximately flat plates slightly converging downwards and driving means for automatically moving the plates relative to one another such that the space between the plates is broadened and narrowed between two extreme positions, a switch and an electrical circuit, said switch forming part of the circuit for controlling the driving means of the plates and tripping means provided at the upper side of the plates, said means being so positioned that the switch is closed when an egg is supported by the plates at the upper side thereof.

12. Apparatus for turning a number of eggs from an initial position, in which the longitudinal axes of the eggs are horizontal into a position in which the said axes are vertical and the tips of the eggs are directed downward, provided with two opposing approximately flat plates slightly converging downwards and driving means for automatically moving the plates relative to one another such that the space between the plates is broadened and narrowed between two extreme positions, a switch with a switch lever being provided at the upper side of the plates for each of the eggs to be handled simultaneously, the lever of each switch being so positioned that the switch is closed when an egg is supported by the plates at the upper side of the said space, the switches being connected in series in a circuit for controlling the driving means of the plates.

References Cited in the file of this patent

UNITED STATES PATENTS

| | | |
|---|---|---|
| 1,609,994 | Ellis | Dec. 7, 1926 |
| 2,324,901 | Bedard | July 20, 1943 |
| 2,471,479 | Coons | May 31, 1949 |
| 2,490,872 | Hommel | Dec. 13, 1949 |
| 2,647,670 | Cox | Aug. 4, 1953 |